Feb. 19, 1935.    A. KOTTMANN    1,991,806
CALCULATING MACHINE
Filed Aug. 4, 1931    8 Sheets-Sheet 1

Inventor:
August Kottmann
By Emil Bönnelycke
Attorney

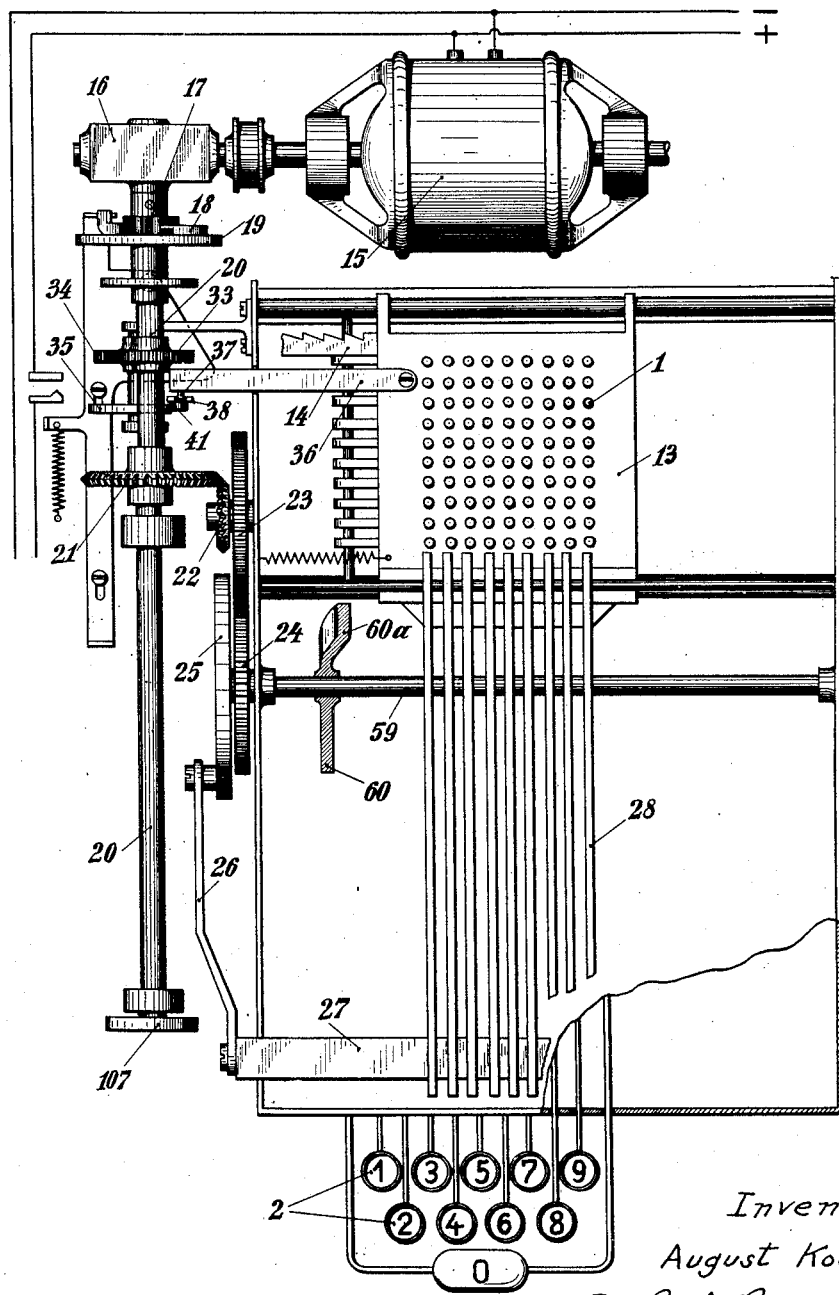

Feb. 19, 1935. A. KOTTMANN 1,991,806
CALCULATING MACHINE
Filed Aug. 4, 1931 8 Sheets-Sheet 3
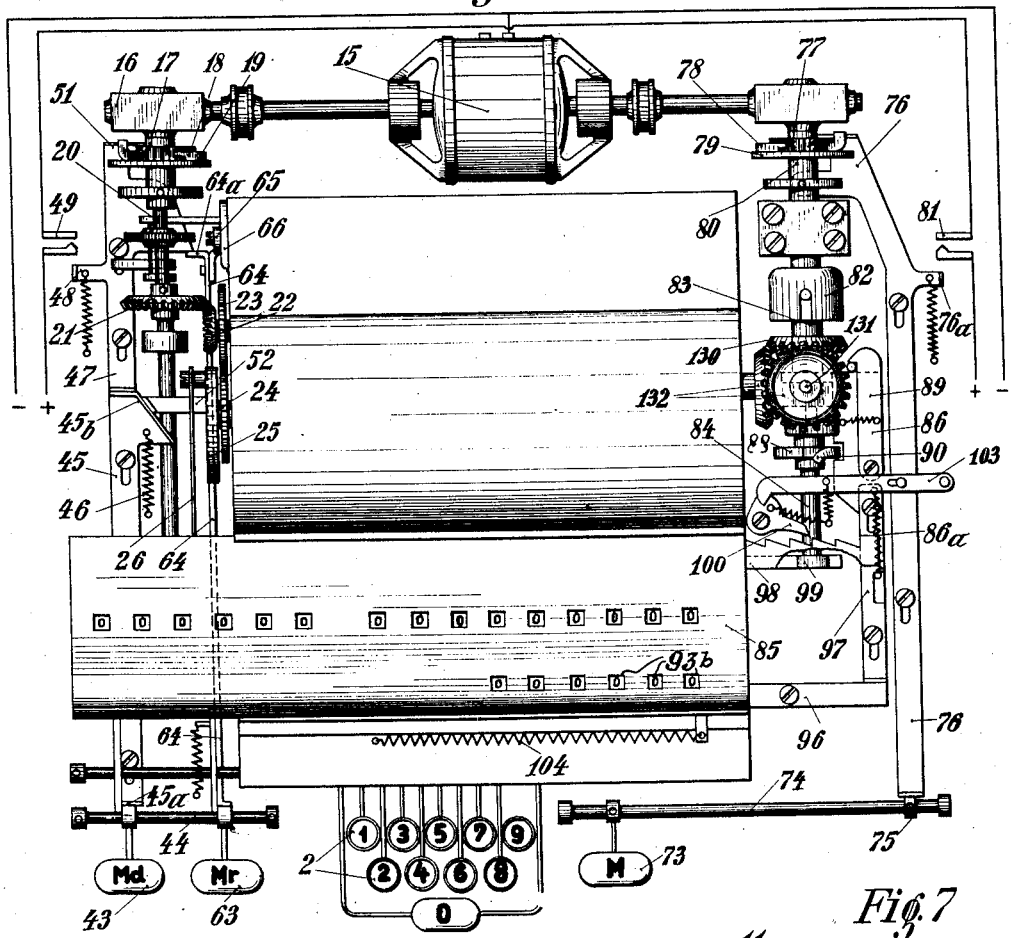
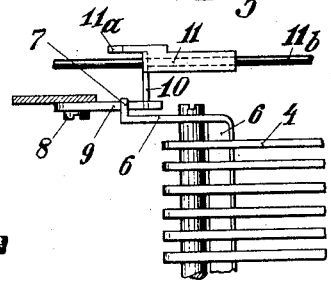
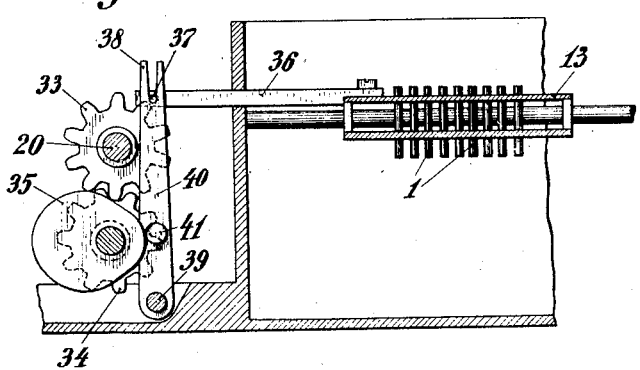
Inventor:
August Kottmann
By Emil Bönnelycke
Attorney Inventor:
August Kottmann
By Emil Bonnelycke
Attorney Feb. 19, 1935.  A. KOTTMANN  1,991,806
CALCULATING MACHINE
Filed Aug. 4, 1931  8 Sheets-Sheet 5
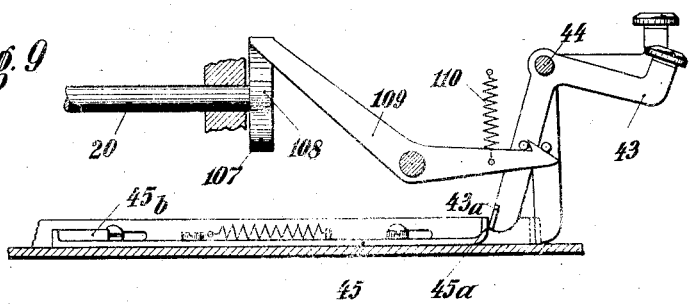
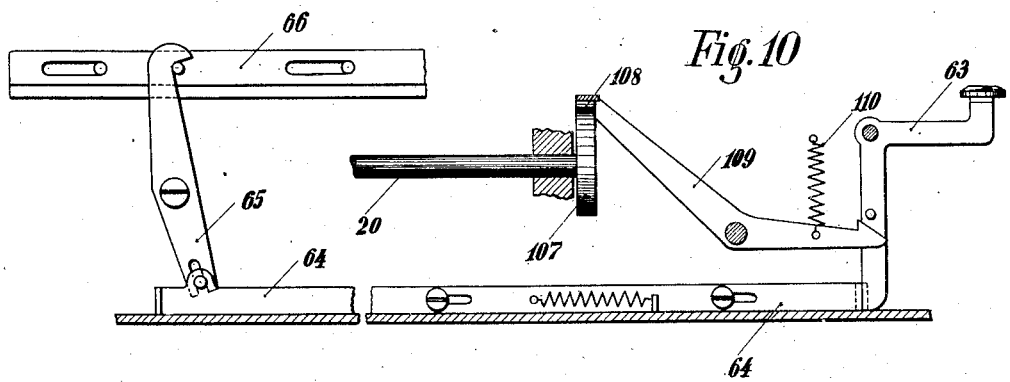
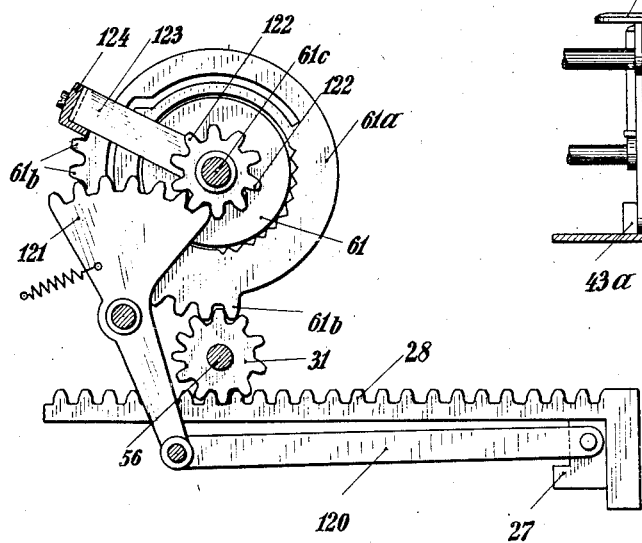
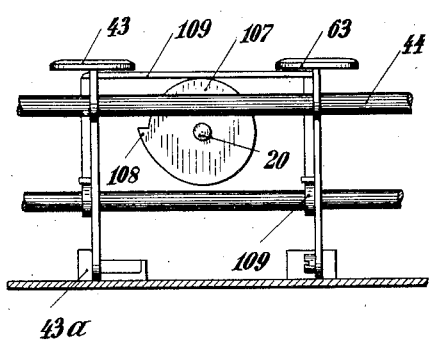
Inventor:
August Kottmann
By Emil Bönnelycke
Attorney Feb. 19, 1935.  A. KOTTMANN  1,991,806
CALCULATING MACHINE
Filed Aug. 4, 1931   8 Sheets-Sheet 6
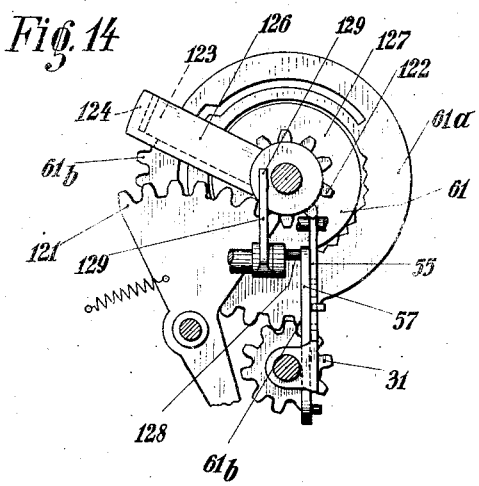
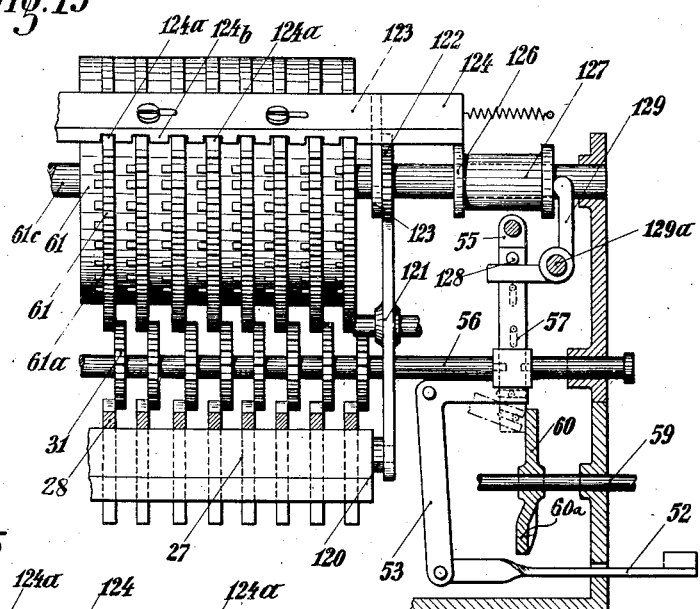
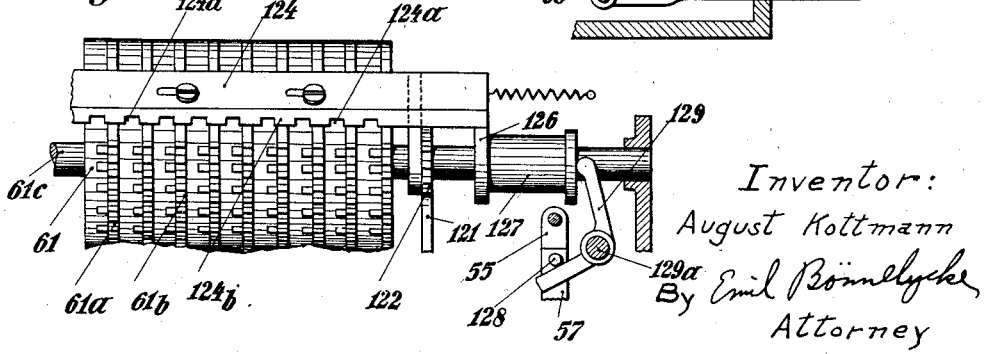
Inventor:
August Kottmann
By Emil Bönnelycke
Attorney Feb. 19, 1935.  A. KOTTMANN  1,991,806
CALCULATING MACHINE
Filed Aug. 4, 1931   8 Sheets-Sheet 7

Inventor:
August Kottmann
By Emil Bömelyche
Attorney

Feb. 19, 1935.  A. KOTTMANN  1,991,806
CALCULATING MACHINE
Filed Aug. 4, 1931  8 Sheets-Sheet 8

Inventor:
August Kottmann
By Emil Bönnelycke
Attorney

Patented Feb. 19, 1935                                                              1,991,806

UNITED STATES PATENT OFFICE 1,991,806

CALCULATING MACHINE

August Kottmann, Sommerda, Germany, assignor to Rheinische Metallwaaren- und Maschinenfabrik Sommerda Aktiengesellschaft, Sommerda, Germany, a corporation of Germany Application August 4, 1931, Serial No. 555,088
In Germany August 5, 1930

2 Claims. (Cl. 235—73)

The invention relates to an automatic zero setting device for the setting elements of the register gearing in calculating machines according to my co-pending application Serial No. 528,105, filed April 6th 1931 for which a continuation-in-part application, Serial No. 710,198 was filed on February 7, 1934. In accordance with the same, both factors of the multiplication to be performed are first pre-set in a setting pin carriage and then transferred from the said setting pin carriage either to the setting elements of the register gearing, as a multiplicand, or to the setting elements of the automatic multiplying device, as a multiplier, by means of gearing controlled by two selecting means (multiplicand key and multiplier key). Before a new multiplicand is transferred to the setting elements of the register gearing, the multiplicand which has been set up in a prior calculation must be cleared. This clearing operation has heretofore been performed manually.

Operating the clearing device by hand however, means a loss of time for the operator of the calculating machine, and a source of errors in calculation, caused by unintentional omission of the clearing of the register gear.

According to the herein described improvement of the device of my co-pending application identified in the foregoing, the above named loss of time is eliminated and an inadvertent omission of the clearing process is made impossible.

It is essential to the invention, that after depressing the multiplicand key, the clearing of the setting means be provided for positively by the transfer mechanism, which transfers the numbers that have been pre-set into the setting pin carriage to the register gearing or the multiplying device, under control of the multiplicand key or the multiplier key, in that upon movement of said transfer mechanism a zero-setting device is positively actuated, said device in general being in an inactive position, and brought into an effective position upon depressing the multiplicand key and then clears the multiplicand previously set in the calculating mechanism before the new multiplicand is transferred.

An exemplary embodiment of the invention is illustrated in the drawings. In said drawings:

Fig. 1 is a side elevation of the setting element carriage with the setting elements, partly in section, Fig. 2 is a top view showing the setting element carriage and the keyboard, Fig. 3 is a plan view of the operating means for the rack bars which transfer the numerical values, Fig. 4 is a plan view of a calculating machine with the drive and control elements exposed to view, Fig. 5 is a partly sectional side elevation of the calculating machine, Fig. 6 is a sectional detail elevation of the back-setting and zero-setting device of the setting element carriage, Fig. 7 is an elevation of a switching device for moving the setting element carriage, Fig. 8 is a partly sectional elevation of the clutch device between the rack bars and the setting discs of the stepped wheels, Fig. 9 is a partly sectional elevation of the selecting key which causes the engaging of the clutching elements of the register drive means, Fig. 10 is a partly sectional elevation of the selecting key which causes the engaging of the clutching elements of multiplying mechanism, Fig. 11 is an elevation of a latching and unlatching drive for both selecting keys, Fig. 12 is a side elevation of the clearing device and the essential parts of the transfer mechanism, Fig. 13 is a front elevation of the device according to Fig. 1, with the clearing device in its inactive position, Fig. 14 is a side elevation of this device, and Fig. 15 is the same as Fig. 2, with the clearing device in its active position.

Figure 1:
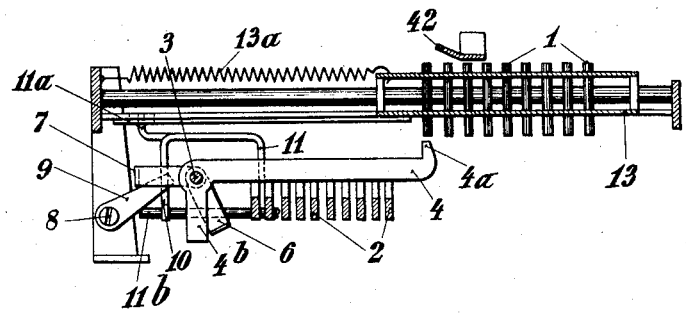

The setting rods 1 are set by the keys 2 whose key levers move the intermediate levers 4 which by means of their hammer-like heads 4a force the setting pins 1 out of their position of rest and which rotate about the shaft 3.

If one of these intermediate levers 4 is lifted by means of the keys 2, then the short arm 4b thereof will press against the bail 6, likewise moving about the shaft 3. The said bail 6, by means of its angle shaped end 7 depresses the pawl which is oscillatable about the screw 8, and which on its turn acts upon the arm 10 of bail 11 which thereby is rocked (Fig. 7) around its axis 11b. The bail actuates by its upstanding arm 11a the anchors 12 which engage in the rack bar 14 (Fig. 2) and thus causes the setting element carriage 13, driven by a spring 13a, to move into the next decimal position.

Corresponding to the number of rows of setting pins, there are rack bars 28 (Figs. 3, 5) supported above the setting element carriage 13, which have downwardly extending portions 28a which abut against a slide element 27. The slide element 27 is set into horizontal reciprocating movement by the motor 15, supported behind the calculating machine, through the gearing 16, drive element 17, clutch pawl 18, clutch disc 19, shaft 20, bevel gears 21 and 22, gear wheels 23 and 24, crank disc 25, and connecting rod 26.

Figure 5:
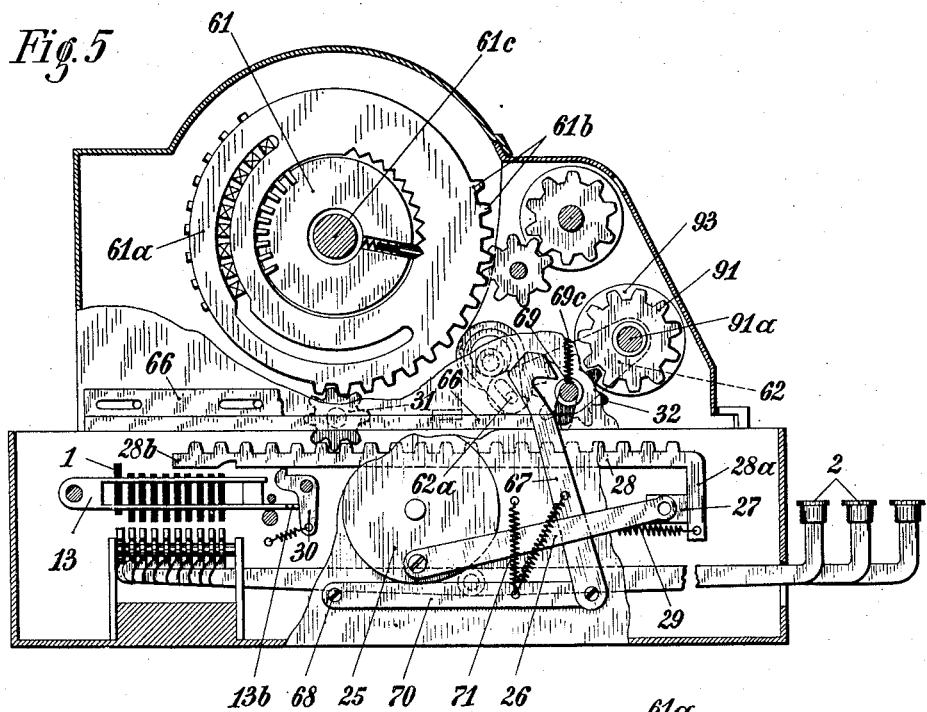

In the position of rest of the drive shaft 20 the slide element 27 in Fig. 5 lies at the extreme right and moves to the left only upon the first half revolution of the crank disc 25, to return into the initial position upon the second half revolution.

The rack bars 28 are drawn to the left by the springs 29 and are thereby in position to follow the movements of the slide elements 27, in case they are not secured in the initial position by the latch 30 provided for each rack bar.

Figure 2:
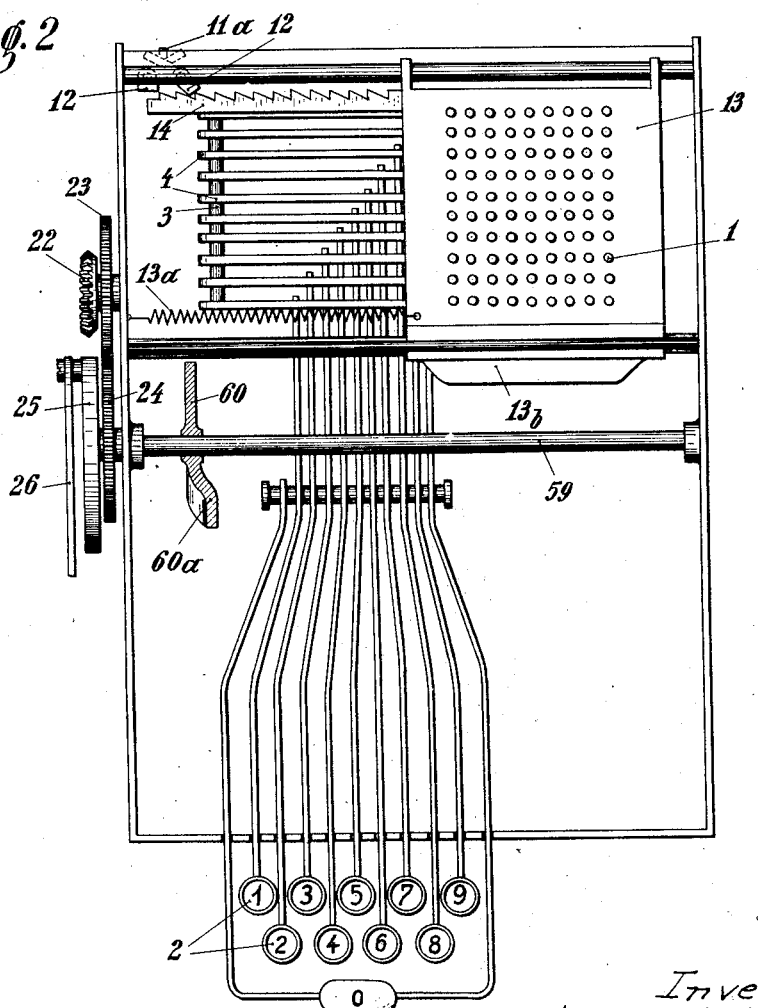

The latches 30 are disengaged by a projection 13b (Figs. 2 and 5) on the setting pin carriage 13, in the shifting of the latter, in such way that always only those rack bars under which rows of setting rods or pins lie can follow the slide element 27, Figs. 2 and 5. When the carriage 13 shifts laterally, only those latches 30 which lie above it will be actuated thereby.

If any setting pin 1 in the setting element carriage 13 is struck by means of the keys 2, the same will project into the field of movement of the rack bar 28 lying above the same. If the slide element 27 is now set in motion by means of the crank disc 25 and connecting rod 26, the rack bar 28 will follow the same until it abuts with its end 28b against the setting pin 1, whereby the magnitude of movement of the rack bar 28 constitutes a measure for the numerical value at that time corresponding to the setting pin 1.

Over the rack bars 28 there are two sets of gear wheels 31 and 32 (Fig. 5), one set of which is adapted to engage with the racks 28 and the setting discs 61a of the pin gears 61 of the register drive mechanism and the other with the racks 28 and the elements 91 of the multiplying device. As will be described, the one set or the other may be brought into engagement on the return of the slide 27 and the rack 28, so that upon the return of the rack bars their movement corresponding to the present numerical value would be transferred either to the register drive mechanism or to the multiplying device.

A bar 36 (Figs. 3 and 6) is secured to the setting element carriage 13 and engages, by means of a pin 37, into the fork 38 of a shift lever 40, arranged rotatably about the shaft 39. Upon the lever 40 there is a lug 41, which, as soon as the setting element carriage 13 moves to the left during the setting operation, enters into the vicinity of the cam 35, moved by the shaft 20, through the gear wheels 33 and 34, so that the setting element carriage 13 is again pressed back into the initial position by this cam after completion of the digits transfer. The inclined surface 42 (Fig. 1) provided over the setting element carriage 13 below which the setting rod carriage 13 passes on the return, provides for "clearing" or restoring the pins 1.

When the setting of the value in the setting pin carriage 13 has been accomplished and the transference of the same to the register drive mechanism as a multiplicand is desired, then the "multiplicand" key 43 (Figs. 4, 9 and 11) arranged in front of the machine, designated "Md", should be actuated. The key 43 is pivoted about the shaft 44 and is so constructed that upon depressing it, its end 43a presses against the surface 45a of the slide bar 45 and shifts the same against the force of the spring 46 (Fig. 4). The slide bar 45 on the one hand carries along the bar 47, which by means of the projection 48 closes the switch 49 for supplying current to the motor 15 and by means of its end 51 releases the clutch pawl 18 and thereby provides connection between the driver 17 and the clutch disc 19 so that now the motor 15 will set the shaft 20 into rotation.

Figure 8:
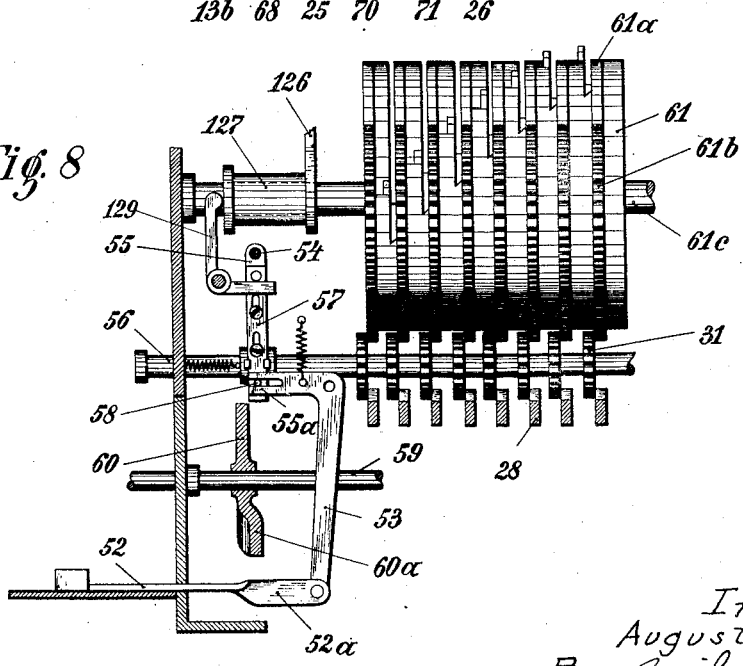

The slide bar 45 simultaneously forces the slide element 52 to the right by means of the incline 45b and thereby shifts the angle lever 53 (Fig. 8).

The fork-like end 55a of the angle lever 53 encompasses the rod 58 of the latch 57, which is shiftable on the lever 55 pivotally arranged about the point 54. The lever 55 is connected with the shaft 56 by suitable means in such manner that it is capable of shifting the latter for a desired distance into the direction of its length, when it itself is moved. When the latch 57 of the angle lever 53 in Fig. 8 is moved downward, it projects into the field of action of the cam 60, rotating with the shaft 59. Shaft 59 is operated by the gear wheel 24 already mentioned. If the shaft 59 and thereby the cam 60 be set into rotation, then during the second half of the revolution, that is, prior to the return of the rack bars 28, the latch 57, the lever 55, and the shaft 56 are forced to the right as seen in Fig. 8 by the rise 60a, so that the gear wheels 31 (Fig. 5) set upon the shaft 56 will come into engagement with the setting discs 61 of the stepped wheels and with the rack bars 28, and thus prepare for the transferring from one part to the other. The numerical value preset in the setting pin carriage is therefore transferred to the register drive mechanism.

Upon an extension of shaft 20 there is provided a cam disc 107 (Figs. 3, 9, 10 and 11) with a tooth 108. The latter is so arranged that after one revolution of the shaft 20 is nearly completed it lifts the latch bail 109, which by means of spring 110 secures the depressed key 43 in such depressed position, and thereby releases the key. At the instant that the key 43 is released, all the devices affected thereby are returned to their initial positions by means of suitably arranged springs. The shaft 20 driving the rack bars 28 therefore makes only one revolution, toward the end of which also the clutching wheels 31 providing the connection between the transfer rack bars 28 and the setting discs 61 of the stepped wheels are again disengaged.

If the transfer of the value preset in the setting element carriage is to take place into the multiplication mechanism 62, that is, if the value is to be used as a multiplier, then the "multiplier" key 63 (Figs. 4, 10 and 11) designated "Mr" is depressed. From this key the switch controlling the motor is closed through the connecting element 4, just as in the previously described key 43, and the clutch pawl 18 is released, that is, the drive is put in action. The member 64 (Fig. 4) has at its rear end a projection 64a extending to the left, which abuts against the projection 47a of the slide bar 47. Furthermore, the lever 65 is so oscillated and the slider 66 (Figs. 4, 5 and 10) so carried along, by the key 63, that the latter, as Fig. 5 shows, presses the hook 67 against the shaft 69 carrying the gear wheels 32.

The hook 67 (Fig. 5) is set into up-and-down swinging motion by means of the cam disc 25 and the lever 70, pivoted at the point 68, which is pressed against the said cam by the spring 71 (in Fig. 4 only the rear end of the slider 66 is shown, the forward end being broken away) in such manner that prior to the second half of the revolution of the cam disc 25, that is, during the return of the slide element 27 and the rack bars 28, it draws the shaft 69 downwardly and brings the gear wheels 32 into mesh with the rack bars 28. Inasmuch as the gear wheels 32 on the other hand are in engagement with the elements 91 of the multiplying device which are to be set, the numerical value preset in the setting pins is transferred into the multiplying device.

The gear wheels 32 do not come out of mesh with the gear wheels 91 inasmuch as the shaft 69 of the gear wheels 32, as well as the shaft 91a (see Fig. 5) of the gear wheels 91, and number wheels 93 are mounted in two links 62, which in turn are swingably mounted at 62a internally on the side walls of the housing of the registering mechanism. The spacing of the shafts 69 and 91a is therefore unchangeable. Both shafts are swung downwardly by the hook 67.

The hook 67 lies closely adjacent the left side wall of the machine frame in substantially the same plane as the crank disc 25, (see Fig. 5) thus rather far to the left. It projects from below into the housing 85 of the registering mechanism, which is open below. The number wheels 93 and the gear wheels 91 and 32 lie rather far to the right in the housing of the register, as may be seen from the location of the peep holes 93b (Fig. 4). The portion of the shaft 69 which comes into engagement with the hook 67 is therefore free from gear wheels 32 and can freely slide through under the hook 67 when the register mechanisms shift.

Similarly to the key 43 provided for the multiplicand, here also the locking pawl for the key 63 will be released after completion of the transfer, by the same device, and the elements depending thereon here also will return to their previous positions, while the supply of current to the motor is interrupted. Thus also in this transfer the shaft 20 completes only one revolution and the rack bars 28 make only a single to-and-fro motion.

After the setting of the values in the setting element carriage and their transfer into the calculating machine has been completed in the above described manner, the key 73 (Fig. 4) designated "M" is used, whereby by means of the shaft 74 and the rod 75 the position of the slide 76 is so changed that it releases the clutching pawl 78 and thereby connects the driver 77 and the clutch disc 79 together and simultaneously closes the switch 81, so that the current is supplied to the motor 15. Thus the shaft 80 is driven.

Figure 18:
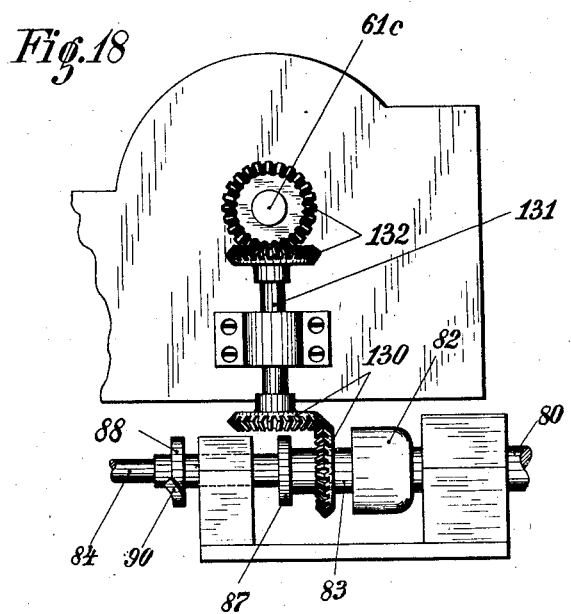
Fig. 18 is a detail elevation of the moving device for the register operating gearing of the calculating machine.
Figure 19:
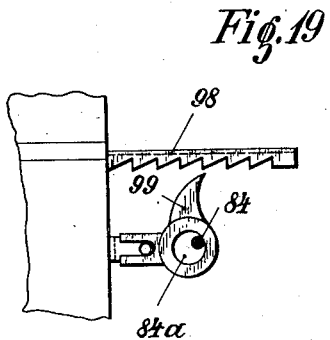
Fig. 19 is a detail elevation of the drive means for moving the register mechanism.
Figure 21:
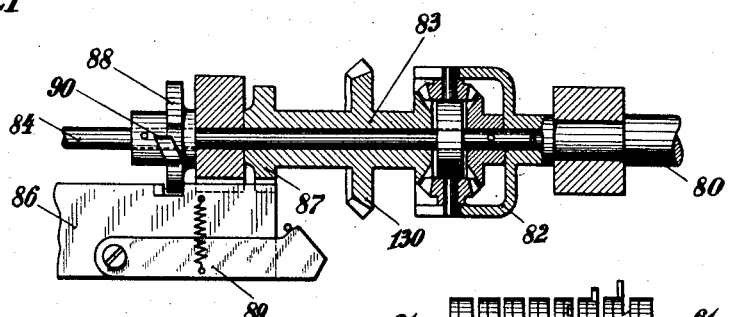
Fig. 21 is a detail view, partly in central longitudinal section, showing the differential mechanism of Figs. 4 and 18 on a larger scale.

By means of a known differential drive means 82 (Figs. 4, 18 and 21) the rotations of the shaft 80 are selectively transferred to one of the other two shafts 83 and 84. The hollow shaft 83 moves by the bevel gears 130, shaft 131, bevel gear 132 and shaft 61c (Fig. 17) the pin gears of the register drive mechanism, whereas shaft 84 actuates the register shift-pawl 99 (Figs. 4, 19). The differential 82 is controlled by a locking element 86 carried in the subframe. This locking element 86 cooperates with two opposed locking elements 87 and 88 (Figs. 4, 18 and 21) of the differential shafts in such manner that when it comes out of engagement with one of the opposed locking elements it immediately is in engagement with the other, so that one of the two differential shafts is always free while the other is locked. Upon the locking element 88 there is provided a tooth 90, which, upon the assumption that the corresponding member is freed for a movement by the locking slide bar 86, toward the end of each revolution again so shifts the said locking slide bar that the shaft 84 is again locked. The shaft 84 is therefore always free only to the extent of one revolution.

The slide bar 86 is actuated by the gear wheels 91 of the multiplying mechanism 62.

Small shifting lugs 92 (Figs. 16, 17) are secured to the gear wheels 91, which depress the lever 94 when the numeral disc 93 secured to the gear wheel 91 passes from "one" to "zero". The lever 94 swings the angle lever 95 to such extent that the latter, through an intermediate member 96 (Figs. 4 and 17), moves longitudinally a slide bar 97 arranged upon the previously mentioned locking slide bar 86, and thereby carries along the locking slide bar 86 in its movement, by means of the spring 86a. The yieldable connection of the slide bars 86 and 97 (through spring 86a) provides, in case any place of the multiplier is equal to "zero", so that the register mechanism moving device must be twice successively engaged, and the shaft 84 must make two successive revolutions, whereby the slide bar 97 (Fig. 4) stands in the upwardly shifted position during two revolutions, yet the slide bar 86 in Fig. 4 may transiently be shifted so far downwardly that the tooth 90 can pass through the notch of the slide bar 86 provided for the same. The register mechanism moving device of the calculating machine, as seen from Fig. 19, consists of a rack bar 98 secured to the register carriage in the ratchet teeth of which engages a moving pawl 99 operated from the shaft 84 through the eccentric 84a so that in case the shaft 84 runs free, upon every revolution of the same the carriage will be carried on for one decimal place.

Figure 20:
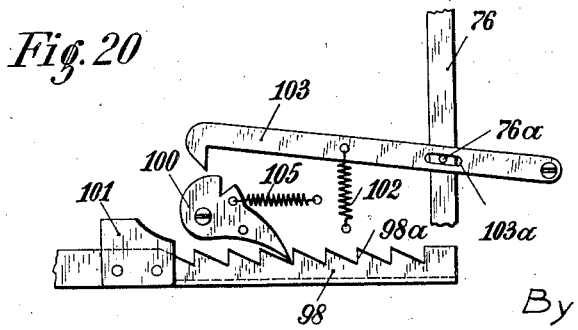
Fig. 20 is an elevation of a locking pawl for the rack bar of the register mechanism moving means.

After each movement of the register mechanism through one place a locking pawl 100 (Figs. 4, 20) falls into a second row 98a of teeth arranged laterally of the rack bar 98 from tooth to tooth and secures the carriage in its position at the moment.

If the carriage moves beyond the position intended for the last place, then a cam 101 forces the locking pawl 100 out of the ratchet teeth while simultaneously a further pawl 103 under the tension of the spring 102 secures it in the uninclined position, so that after completion of the calculation the carriage is automatically drawn back into the initial position by means of the spring 104 and stands ready for a further calculating operation.

The pawl 103 is connected by a slot and pin connection (76a, 103a) to the rod 76 which by depressing the multiplication key 73 throws in the drive motor of the calculating machine. The pawl 100 when engaging the teeth 98a locks the pawl 103 and the rod 76 in the position in which it holds the drive motor and the main clutch of the calculating machine thrown in.

As soon as the pawl 103 is unlocked, by throwing out pawl 100, the drive motor 15 and the main clutch 77, 78, 79 are thrown out by spring 76b. Upon pressing the key 73 for a new calculation operation the pawl 103 is removed from its locking position by the bar 76, so that the locking pawl 100 again falls into the ratchet teeth 98a through the tension of spring 105.

Figure 22:
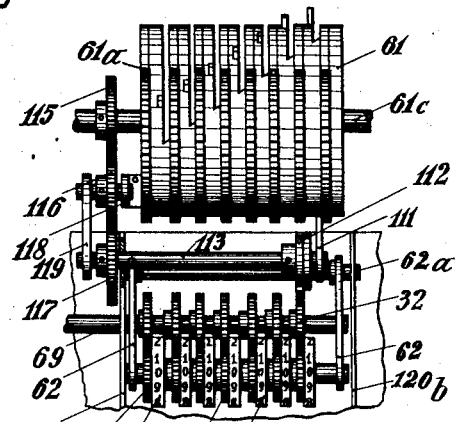
Fig. 22 is an end view partly in section of the setting discs and associated parts.
Figure 23:
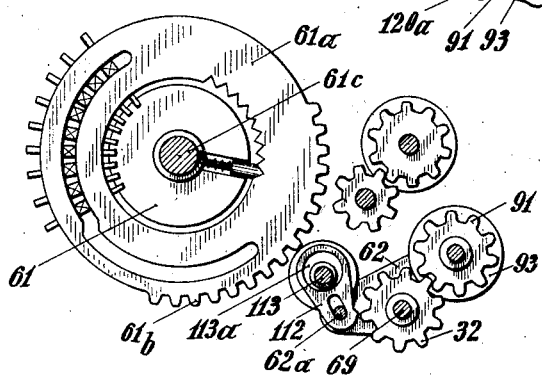
Fig. 23 is a side view of Fig. 22.
Figure 24:
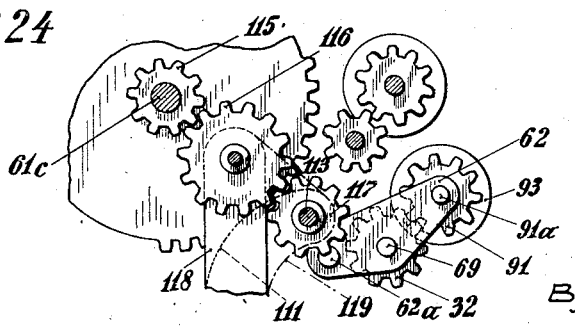
Fig. 24 is a side view of further details associated with the setting discs.

The machine operates as follows in calculating a product:

The gear wheels 32 which are in engagement with the adjusted elements 91 of the multiplying device come into engagement in order, due to the shifting of the register mechanism, with a transporting pawl 112, Figs. 22 and 23, arranged unshiftably in the frame of the machine, which is made similarly to the transporting pawl 99 of the register mechanism moving device. This transporting pawl 112 is moved by means of gear wheels 115, 116, and 117, the shaft 113 and the eccentric disc 113a by the drive shaft 83 of the register drive mechanism 61 and is guided by an elongated slot on the shaft 62a. The pawl 112 together with its drive is non-slidably mounted in the frame of the machine.

The shaft of the intermediate wheel 116 and the shaft 113 are mounted in the frame of the machine by means of holders 111, 118 and 119 whereas the shaft 62a is mounted in the intermediate walls 120a and 120b of the register housing.

The shaft 113 rotates at the same speed as the shaft 83 so that upon every revolution of the shaft 83 the pawl 112 turns the wheels 32 and 91 to an extent corresponding to the numerical value "one" back toward the zero position. Thus if previously the gear wheel 91 and the number wheel 93 were set to correspond to the numerical value 5, then upon the fifth rotation the number disc will pass from "one" to "zero" and the register shifting mechanism is released. After the multiplicand set in the register drive mechanism has been added five times in the "result" mechanism, therefore the counting mechanism carriage moves further to the extent of one place so that now the next wheel 32 comes into engagement with the transporting pawl. In this position of the register mechanism again as many additions are carried out as correspond to the setting of the number wheel 93, now moved by the transport pawl, whereupon the register mechanism shifting mechanism is again released etc., until all the number wheels 93 are set to "zero". For those gear wheels which are set to correspond to the digit "zero", only a movement of the carriage takes place. When the calculation has been carried out and the carriage has reached the end position, then as already stated the release of the latching pawl 100 takes place together with the return of the carriage into the initial position.

If a "zero" is contained at any place whatever of the multiplier which has been introduced, so that the lever 94 which corresponds to the multiplier setting member which has been set to correspond to zero in this place, is raised ab initio, then at the instant that this said multiplier setting element which indicates a zero goes into action, the inclined part 94b, of the lever 94, enters under the horizontal arm of the angle lever 95. Thereby the shifting means for the register is immediately put into engagement.

Figure 16:
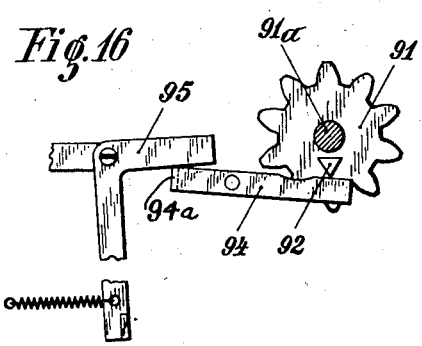
Fig. 16 is a detail side elevation of the control of the drive device for the moving of the register mechanism.
Figure 17:
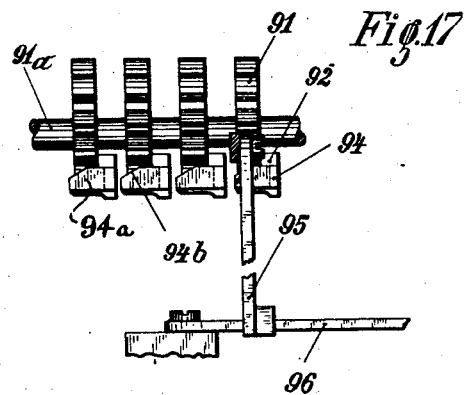
Fig. 17 is a rear elevation of the control means illustrated in Fig. 16.

The levers 94 are bent around at the end, to form tongues or lugs 94a projecting to the left, as shown in Figs. 16 and 17. These tongues have the inclined parts 94b, above mentioned, upon the left side.

Depression of the multiplicand key 43 produces a movement of the push bar 52 (Fig. 13) toward the left. Thereby the electric motor is started, and is clutched to the shaft 59 of the revolving cam disc 60. The shaft 59 together with the cam disc 60, actuates a crank drive which displaces the carrier 27 (Figs. 12 and 13) in a horizontal reciprocating movement. An additional push bar 57 (Fig. 13) connected with the swingable lever 55 also is moved downward by the push bar 52 by means of the intermediate lever 53 in such way that it enters into the field of movement of the cam disc 60.

The rack bars 28 (Fig. 12) are drawn to the left by springs, so that during the first half-revolution of the shaft 59 and the crank mechanism actuated thereby, the rack bars 28 follow the carrier 27 until they abut against the setting pins which have been pre-set to correspond to the multiplicand and thus will become set to correspond with said multiplicand. The lateral lug 60a of the cam disc 60 is so arranged that, during the second half-revolution of the shaft 59 wherein the rack bars 28 are pushed back into the initial position by the crank mechanism and the carrier 27, it swings the lever 55 which carries along the non-rotatable shaft 56 of the gears 31 and shifts the same axially, in such way that the gears 31, which are arranged rotatably but not shiftably upon the shaft 56, come into mesh with the rack bars 28 and the teeth 61b on the periphery of the setting discs 61a of the pin gears 61. During the second half-revolution of the crank mechanism, which causes the returning of the rack bars 28, which were previously set in accordance with the multiplicand, to their initial positions, the rack bars and the setting discs are clutched together so that now the seting discs become set in accordance with the multiplicand whereby the multiplicand, previously set in the setting pins, is transferred to the setting elements of the register gears.

The gear segment 121 is driven by the carrier 27 by means of the link 120 and in turn sets a bail 123, mounted loosely upon the shaft 61c of the pin gears 61, into swinging movement by means of the gear wheel 122 connected to said bail. The bail 123 lies closely adjacent the periphery of the pin gears 61. The zero setting bar 124 is connected with the bail 123, the notches 124a thereof normally permitting the gear segments 61 of the setting discs 61a to pass unhindered, so that the pin gears as well as the setting discs may be revolved unhindered by the shaft 61c, and the bail 123, together with the zero setting bar 124, may also be swung to and fro unhindered, without detriment to the setting of the setting discs 61.

The zero setting bar 124 is so connected to the bail 123 that it may be shifted longitudinally through the extent of one half the space between two adjacent pin gears, and is connected, by means of an arm 126 with a carrier sleeve 127 which is freely rotatable and longitudinally shiftable upon the shaft 61c of the pin gears.

If the pushers 52 and 57 are shifted by depressing the multiplicand key, the pusher 57, through a pin 128, will act upon an angle lever 129 which in turn will so shift the carrier sleeve 127 and the zero setting bar 124 that now the projections 124b of the zero setting bar 124 will be in alignment with the gear segments 61b of the setting discs 61a of the pin gears 61 (Fig. 5).

The bail 123 and the zero setting bar 124 execute a downward swinging motion upon each swinging movement of the carrier 27, namely during the first one-half revolution of the crank mechanism which moves the carrier 27, that is, during the setting of the rack bars 28 in accordance with the setting pins, when the rack bars 28 are not yet connected with gears 61 by the gear wheels 31. If now the bar 124 be so shifted, by depressing the multiplicand key, that the projections 124b will be aligned with the gear segments 61b then the setting disc 61a of the pin gears 61 will be set to zero, since the projections 124b abut against the uppermost tooth of the gear segments 61b and thus carry along the setting discs 61a.

Upon the swinging back of the carrier 27, that is, upon transferring the new multiplicand to the setting discs 61a of the pin gears, the bail 123 and the zero setting bar 124 will swing back into their initial positions. Then the setting discs 61a following the zero setting bar 124, will be turned by the rack bars 28 and the gears 31 which are now brought into mesh, to the extent of such number of teeth as corresponds to the numerical value of the corresponding digit of the multiplicand.

After transferring the new multiplicand, the multiplicand key which is locked in its depressed position, in known manner is again released by the transfer mechanism itself, whereupon the key and the parts moved thereby will return to their inactive positions under the influence of spring power. Thus the gear wheels 31 are also again disengaged and the zero setting bar 124 is again so shifted that the gear segments 61b can pass unhindered through notches 124a. Thus the pin gears 61 may, as is necessary for carrying out the calculating operation, be turned at will by the shaft 61c of the pin gears without thereby changing the setting.

If a numerical value be transferred to the multiplying means as a multiplier by pressing the multiplier key, then the carrier 27, the bail 123 and the zero setting bar 124 will indeed also be swung to and fro once. However, inasmuch as the angle lever 129 is not swung and the zero setting bar 124 is not shifted upon depressing the multiplier key, the projections 124b will not be in alignment with the gear segments 61b and no zero setting of the setting discs 61a will take place.

I claim as my invention:

1. A calculating machine comprising a register, a register drive gear having multiplicand setting elements therein, a zero setting mechanism for the setting elements, a multiplicand selector, a multiplicand transfer mechanism adapted to be set in operation by the multiplicand selector, means connecting said zero setting mechanism to said multiplicand transfer mechanism so that the zero setting means are moved every time the multiplicand transfer mechanism is moved, and means moved by the multiplicand selector for bringing the zero setting means into an active position.

2. A calculating machine comprising a drive gear having multiplicand setting elements therein, a zero setting mechanism for the setting elements, a multiplicand selector, a multiplicand transfer mechanism adapted to be set in operation by the multiplicand selector, means connecting said zero setting mechanism to said multiplicand transfer mechanism so that the zero setting means are moved every time the multiplicand transfer mechanism is moved, and means moved by the multiplicand selector for bringing the zero setting means into an active position.

AUGUST KOTTMANN.